US006571095B1

(12) United States Patent
Koodli

(10) Patent No.: US 6,571,095 B1
(45) Date of Patent: May 27, 2003

(54) SYSTEM AND METHOD FOR PROVIDING ADDRESS DISCOVERY OF SERVICES IN MOBILE NETWORKS

(75) Inventor: Rajeev Koodli, Natick, MA (US)

(73) Assignee: Nokia Internet Communications Inc., Mountain View, CA (US)

( * ) Notice: Subject to any disclaimer, the term of this patent is extended or adjusted under 35 U.S.C. 154(b) by 0 days.

(21) Appl. No.: 09/475,034

(22) Filed: Dec. 30, 1999

(51) Int. Cl.⁷ ................................................ H04Q 7/20
(52) U.S. Cl. ........................ 455/435; 370/913; 707/10
(58) Field of Search ............................... 455/432–439, 455/445; 370/254, 328, 912, 913; 707/10, 104.1; 709/223, 225

(56) References Cited

U.S. PATENT DOCUMENTS

| 5,895,471 A | * | 4/1999 | King et al. ............... 707/104.1 |
| 6,359,880 B1 | * | 3/2002 | Curry et al. ................ 370/352 |
| 6,389,008 B1 | * | 5/2002 | Lupien et al. .............. 370/352 |

FOREIGN PATENT DOCUMENTS

| EP | 0 915 626 | 5/1999 |
| WO | WO 99 61966 | 12/1999 |

OTHER PUBLICATIONS

Sengodan, S: "A Gatekeeper Discovery Mechanism for H.323 Systems", Proceedings of the SPIE, 1999, XP000893007, pp. 319–326.

* cited by examiner

Primary Examiner—Quochien Vuong
(74) Attorney, Agent, or Firm—Antonelli, Terry, Stout & Kraus, LLP

(57) ABSTRACT

The invention is a method and a network which provides mobile terminals (12) with the address of and access to application services. A network in accordance with the invention includes a plurality of mobile terminals which transmit and receive information transmitted through the network (100, 200); at least one storage (52), coupled to the network, which is accessible by the plurality of mobile terminals that provides services to the mobile terminals; and a directory storage (102), coupled to the plurality of mobile terminals, which stores addresses of the at least one storage and which provides in response to a communication at least one address of the at least one storage to at least one of the mobile terminals with which the plurality of terminals may communicate to obtain service therefrom.

43 Claims, 5 Drawing Sheets

SYSTEM AND METHOD FOR PROVIDING ADDRESS DISCOVERY OF SERVICES IN MOBILE NETWORKS

BACKGROUND OF THE INVENTION

1. Field of the Invention

The present invention relates to methods and systems for identifying and addressing service providers in packet data networks from whom mobile terminals can obtain application level services.

2. Description of the Prior Art

Voice over IP (VoIP) networks having a network architecture of a cellular network connected to a packet data network map addresses from the numerically based addressing of the cellular mobile networks to the alphanumeric addressing mechanism such as universal resource locators (URLs) of packet data networks such as IP networks. Such systems are specified under H.323 and include gatekeepers.

Gatekeeper discovery mechanisms have been proposed in order for mobile terminals to have access to application level network services such as VoIP. With one of these mechanisms a mobile terminal will actively communicate with the servers in the packet data network from which available services may be obtained by using multicast probing to access the servers in the network. With the other mechanism, the mobile terminals will monitor communications in the network to identify periodic announcements from servers in the packet data network from which application level services are available and, in response to an announcement from server(s) that services are available, the mobile terminal will register with the available server(s). The foregoing mechanisms by which mobile terminals may obtain the location of application level services provided by servers in a packet data network increase the transmissions through the packet data network in proportion to the number of available servers providing services to the mobile terminals and can reach an undesirable level, especially when the communications are over mobile packet data networks which have limited bandwidth.

The service location protocol (SLP) defines agents in a network which may be discovered by use of dynamic host configuration protocol (DHCP). When a terminal powers up and executes DHCP procedures, it may request location of a SLP agent, such as a service agent, by utilizing option 78 in the DHCP discovery message.

FIG. 1 illustrates the architecture of the general packet radio system (GPRS) 10. The GPRS 10 has entities which support radio transmission of packet data transmissions. A plurality of mobile terminals 12, which may be connected to a computer 14, communicate via radio communications 16 to a base station 18 which includes a transmitter 20 and a controller 22. Each base station is associated with a mobile switching center (MSC) and visiting location register (VLR) 24 with which the mobile terminals 12 register when activated in the network. The base station 18 and the MSC and VLR 24 may be in accordance with the GSM (global system for mobile communications) network specifications. The GPRS 10 has an infrastructure 26 which includes a plurality of serving general packet radio systems support nodes (SGSN) 28 which perform the functions of authenticating the mobile terminal when the user wishes to connect to the GPRS network and also act as the nodes responsible for setting up GPRS sessions for carrying such traffic as IP. The GPRS infrastructure 26 further includes a backbone network 30 which provides wireline interconnections to the various entities in the GPRS infrastructure 26. The GPRS infrastructure 26 further includes at least one gateway general packet radio system support node (GGSN) 32 which provides gateway functions to external data networks 34 which may be without limitation the internet or an X.25 data network from which services may be accessed by the mobile terminals 12. Firewalls 36 may be provided between the GGSN 32 and the external networks 34. Additionally, at least one gateway 37 provides gateway services between the GPRS infrastructure 26 and other GPRS operators 38 through a firewall 40. The GPRS 10 further includes an SS7 network 42 of known design which provides support for the establishment of communications between different entities in the network such as without limitation between different mobile terminals 12. A home location register (HLR) 44 provides functionality of the type performed by the HLR in the GSM system. Additionally, other data networks 46, such as the internet are connected through a GGSN 32 to a plurality of corporate entities via a router 48 to a local area network including a corporate server 50.

The GPRS 10 may include. at least one mobile service providing server 52 which may be, without limitation, at least one host application level service entity, such as a call processing server (CPS), a streaming server, or an application server. A CPS performs the functions of setting up, controlling and tearing down of VOIP calls among other functions. A streaming server performs the functional of providing movies, audio or other playback of information on demand from a packet data network. An application server performs the function of running functions that either the mobile terminals 12 cannot support or runs functions for the mobile server.

The GPRS 10 suffers from the deficiencies discussed above regarding discovery and registration by the mobile terminals with the at least one mobile service providing server 52 to obtain application level services for the mobile terminals. The active or passive discovery technique by which the mobile terminals 12 obtain application level services from at least one mobile service providing server 52 burdens and overloads the GPRS 10 with undesirable communications especially in view of the limited bandwidth available.

SUMMARY OF THE INVENTION

The present invention is a network and a method of providing mobile terminals in a packet data network with an address of at least one storage device which stores the address of at least one service providing entity, such as a server from which application services are obtainable, by the mobile terminals. In accordance with the invention, a directory storage, which may be implemented as an advertisement server, provides addresses to the mobile terminals in the network of at least one mobile service providing server from which diverse types of application level services may be obtained by the mobile terminals. The advertisement server is a repository of addresses of servers in the network with which the plurality of mobile terminals may register and obtain application level servers therefrom. Once a mobile terminal obtains an address of at least one mobile service providing server from the directory storage for use by a mobile terminal, the mobile terminal communicates with each mobile service providing server to further discover specific application services that are available to the mobile terminal. The network may operate under specified access control rules so that at least one service from the mobile service providing servers is made available to the mobile terminal based upon specified conditions such as, but not limited to, the identity of the mobile terminal, preferences of services which the mobile terminal desires to procure from the mobile service providing servers, any roaming protocol which is to be used, or prevailing network conditions including, e.g. load on the individual server(s), or any other type of conditions which are desired to be used as a basis to control access. The directory storage may be implemented in accordance with the Service Location Protocol (SLP) as a service agent. However, discovery of such an agent when DHCP is not available and multicast-based approaches are not desirable is addressed by the present invention in which the address of the directory storage is provided to the mobile terminal upon its network registration. However, the invention is not limited to SLP and/or dynamic host control protocol.

The mobile terminals, upon activation, register with the network which may be performed by either of two service registration processes. The address of the directory storage is required before application level service registration can be effected by either of the two service registration processes. The registration process may be comprised of a first part in which the mobile terminal registers with the network for connectivity and transport services in accordance with well-known cellular network or other known network registration principles and, in a second part, registers to obtain application level services which is hereinafter referred to as service registration which may be without limitation VoIP or any other application level service. One type of service registration process is referred to as the distinct service registration process in which the network supplies the address of the directory storage to the terminal and another type of registration process is referred to as an integrated service registration process during which the network itself communicates with the mobile terminal after successful network registration and performs registration with available servers on behalf of the terminal. With the integrated service registration process, the network returns to the mobile terminal a list of registered services and the addresses of the services from which the services are obtained which addresses may be URLs of the individual mobile service providing servers in the network. Thereafter, the mobile terminal stores the list of available services which are obtainable by addressing mobile service providing servers with the URLs or other addresses of the mobile service providing server entities in the network. The mobile terminal uses wireless packet data communications to communicate with the mobile service providing servers which are accessible by the addresses obtained via one of the registration processes described earlier.

The registration procedure with the network may be in accordance with the GPRS Attach procedure which is known and the service registration procedure may be in accordance with an H.323 registration message if the mobile service providing server in question is a VoIP server with H.323 protocol support.

The network is required to provide the address of the directory storage. When the integrated service registration process is utilized, the network has to perform the service registration on behalf of the mobile terminal once the network registration by the mobile terminal is successful. In response to a network registration request by the terminal, which may be a GPRS Attach procedure, the network may perform service registration with servers accessible to the terminal and return addresses of those servers with suitable attributes (such as their capabilities, e.g., whether the VoIP server supports multi-party conferencing) which the mobile terminal can use when services are to be obtained. The service registration procedure may precede a GPRS session establishment procedure which is established using a PDP context establishment message (a PDP context activation allows a mobile terminal to send and receive packet data in a GPRS network) so that service registration messages may be carried over established PDP sessions. A PDP session must be established before service registration messages may be carried over the PDP session. However, if the distinct service registration process is utilized, the network only has to return the address of the directory storage.

The function of the directory storage is to provide the addresses of available mobile service providing servers to the mobile terminals. In the distinct service registration process, the directory storage may process the service registration request from the mobile terminal and apply access control rules based upon varying conditions such as, terminal preference, user alias, the network state in terms of its utilization, server state in terms of server utilization, etc., and provide to the mobile terminal only those addresses which are allowed to be accessed by the mobile terminal. The directory storage may obtain the processing criteria used to complete a selective service registration requested from other entities in the network. Furthermore, the directory storage, in addition to providing addresses of the mobile service providing servers, may also return service attributes which constitute capability and function, such as, can the address server support VoIP, call forwarding, multiparty calls, etc, of the mobile service providing server.

The invention in one form is a network. A plurality of mobile terminals transmit and receive information transmitted through the network. At least one storage is coupled to the network which is accessible by the plurality of mobile terminals that provides services to the mobile terminals. A directory storage is coupled to the plurality of mobile terminals which stores addresses of the at least one storage and which provides in response to a communication at least one address of the at least one storage to at least one of the mobile terminals with which at least one of the mobile terminals may communicate to obtain service therefrom. The network may comprise a packet data network. The network may comprise a packet data network and a cellular network which are coupled together with a gateway. The mobile terminals may be within the cellular network and the directory storage and the at least one storage may have addresses in the packet data network. The network comprises at least one entity which stores a profile of each mobile terminal and the plurality of terminals, upon activation in the network, register with the network and the directory storage provides an address of each storage providing a service stored in the profile of the at least one entity from which the registered terminal may access services. The at least one entity may be a home location register. The network provides each of the plurality of mobile terminals an address of the directory storage upon activation and registration of each of the mobile terminals with the network. Each mobile terminal upon activation registers with the network and in response to mobile terminal registration, the network registers each activated mobile terminal with the directory storage and the directory storage returns an identification of any available registered services to each mobile terminal which stores the identification of registered services for future access. The directory storage applies access control rules to control access of the at least one mobile terminal to the at least one storage.

The invention is also a method of providing a plurality of mobile terminals with services. The method is practiced in a network having a plurality of mobile terminals which transmit and receive information transmitted through the network and at least one storage which is accessible by the plurality of mobile terminals and which provides services to the mobile terminals. A directory storage is coupled to the plurality of mobile terminals which stores addresses of the at least one storage from which the mobile terminals may obtain services. In response to a communication in the network, an address of at least one storage is provided to at least one mobile terminal from which the at least one mobile terminal may obtain services. The at least one mobile sends a communication to the address of the at least one storage requesting that the addressed storage provide services to the at least one terminal sending the communication. The network may comprise a packet data network. The network may comprise a packet data network and a cellular network which are coupled together with a gateway. The mobile terminals may be within the cellular network and the directory storage and the at least one storage may have addresses in the packet data network. The network comprises at least one entity which stores a profile of each terminal and the plurality of terminals, upon activation in the network, register with the network and the directory storage provides an address of each storage providing a service stored in the profile of the at least one entity from which the registered terminal may access services. The at least one entity may be a home location register. The network provides each of the plurality of mobile terminals an address of the directory storage upon activation and registration of each of the mobile terminals with the network. Each mobile terminal upon activation registers with the network and in response to mobile terminal registration, the network registers each activated mobile terminal with the directory storage and the directory storage returns an identification of any available registered services to each mobile terminal which stores the identification of registered services for future access. The directory storage applies access control rules to control access of the at least one mobile terminal to the at least one storage.

BRIEF DESCRIPTION OF THE DRAWINGS

Like reference numerals identify like parts throughout the drawings.

DETAILED DESCRIPTION OF THE INVENTION

Figure 1:
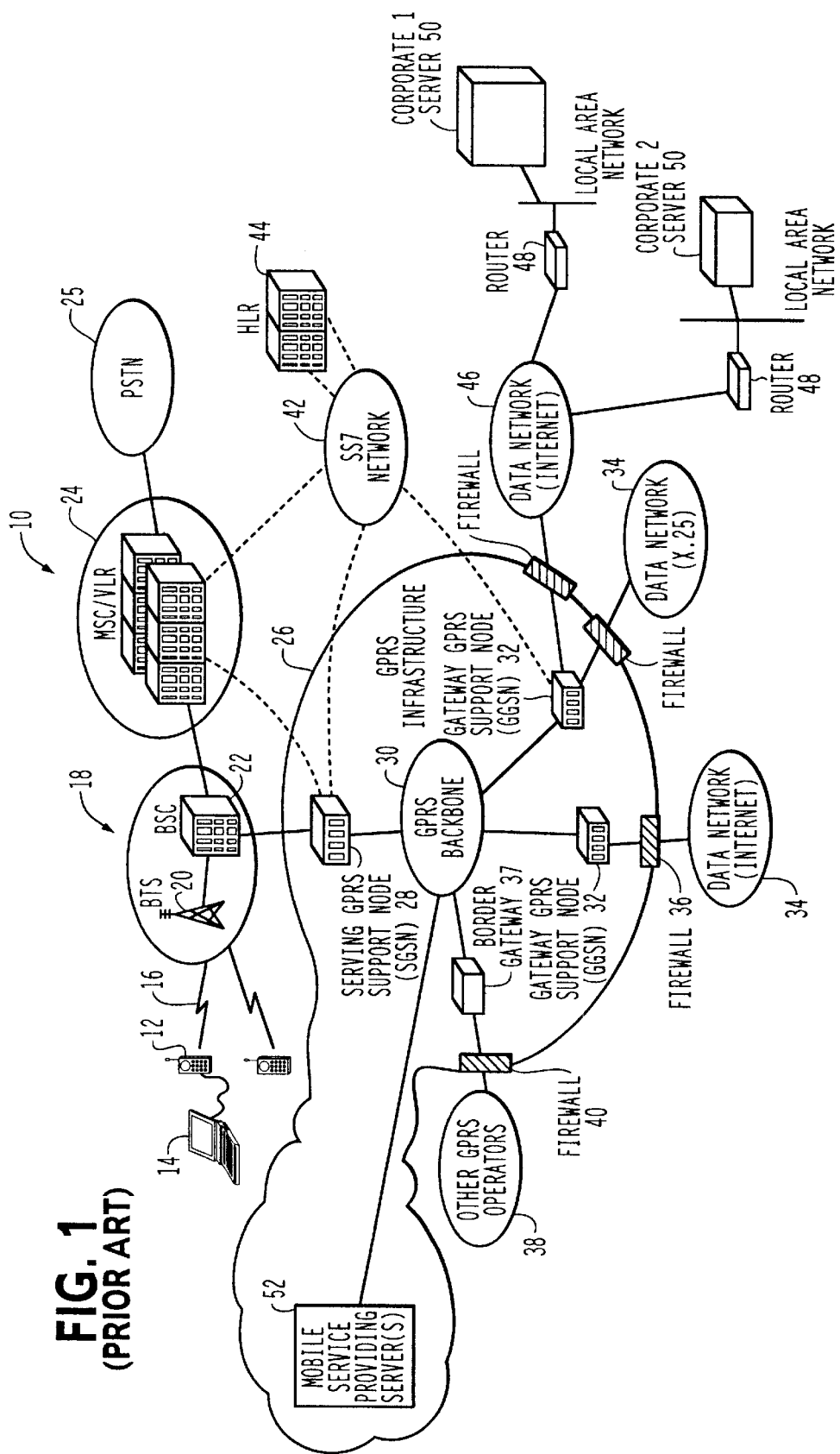
FIG. 1 illustrates a prior art diagram of a GPRS.
Figure 2:
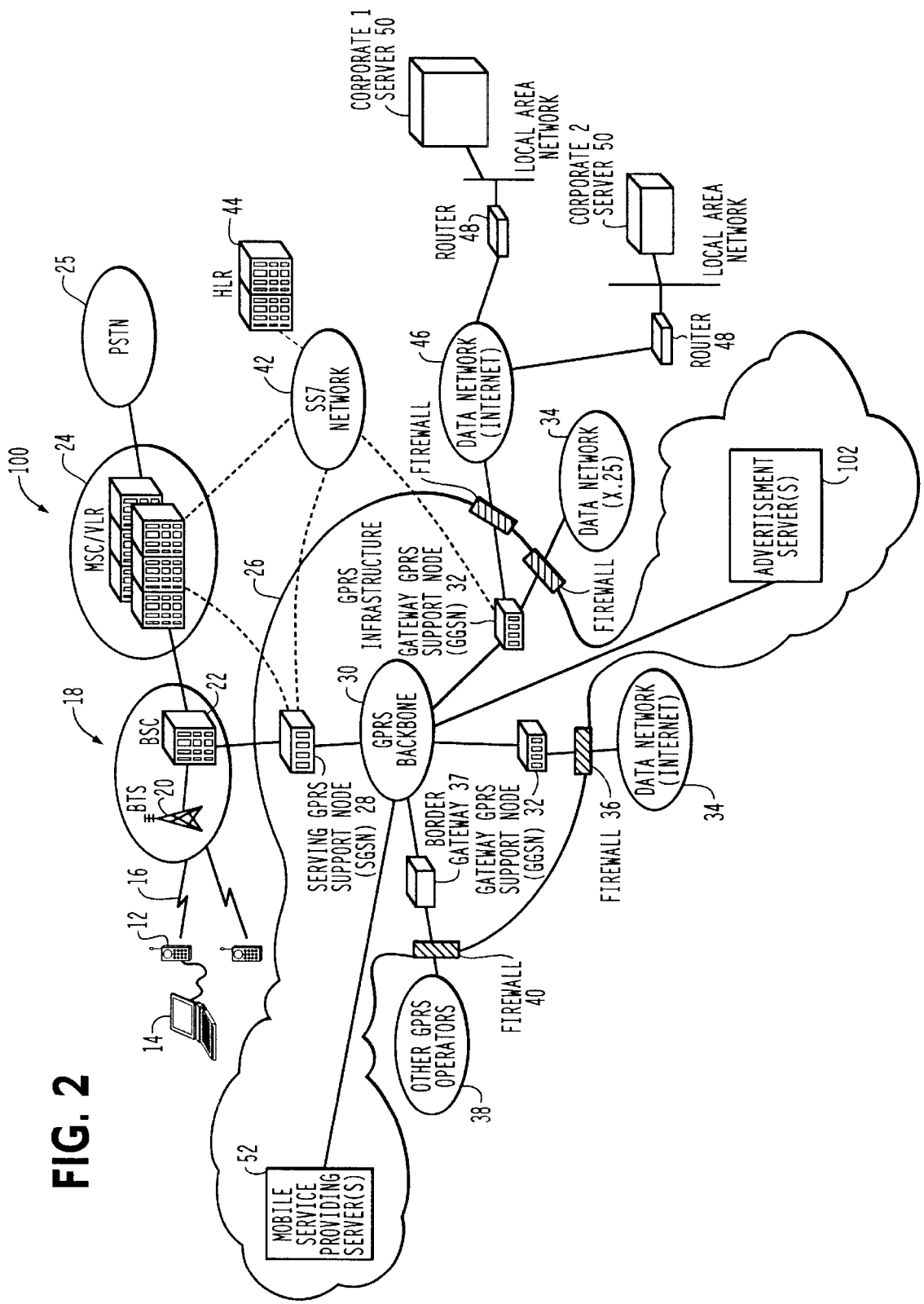
FIG. 2 illustrates a first embodiment of a network in accordance with the present invention in a GPRS.

FIG. 2 illustrates a first embodiment 100 of a GPRS network in accordance with the present invention. However, it should be understood that the invention is not limited to a GPRS network architecture. The embodiment 100 differs from the prior art of FIG. 1 in that at least one advertisement server 102 is coupled to the GPRS infrastructure 26 to provide a directory storage of the available mobile service providing service(s) 52 which is coupled to the plurality of mobile terminals 12. The mobile terminals 12, when regis-tered with the network, may store addresses of the at least one mobile service providing servers 52 from which application services may be obtained. The mobile service providing servers 52 function as a storage and source of application services provided to the mobile terminals. The directory storage provides, in a response to a communication in the network at least one address of at least one mobile service providing server 52 to which the plurality of mobile terminals may communicate to obtain application level services therefrom. The advertisement server(s) 102 function as a storage or repository of the addresses of the plurality of mobile service providing servers 52 in the network which are available in the mobile network to provide application level services to the mobile terminals. The mobile service providing servers 52 may provide diverse types of host application level services for the mobile terminals 12 as a consequence of the mobile terminals not supporting the service or desiring to obtain an application level service such as, providing calling services, such as but not limited to VoIP, a streaming server, an application server, etc.

The mobile terminals 12 may obtain VoIP services from the mobile service providing server 52 including a combination network transport services, such as quality of service and security and application level control protocols, such as H.323 and Session Initiation Protocol (SIP). The GPRS 10 advertises and hosts application level service entities which are the mobile service providing service(s) 52 such as CPS and provides the required network level capabilities provided by the mobile service providing servers to support multiple services to the mobile terminals 12. The functionality of providing application level services to the mobile terminals 12 is dependent upon effective advertisement and discovery of the available services.

Each mobile terminal 12 discovers the address of an advertisement server 102 after network registration for transport services. Once a mobile terminal 12 has obtained the address of the advertisement server 102, the mobile terminal communicates with the advertisement server 102 to discover services which are available thereto using either unrestricted or specified access control rules defining services that are made available to the mobile terminals dependent upon conditions such as, identity and preference of the mobile terminal, its roaming protocol to be used, or prevailing network conditions, including e.g. load on the individual server(s). The advertisement server 102 may be implemented in accordance with the SLP as a service agent.

When a mobile terminal 12 registers with the network, the network provides the address of at least one advertisement server 102 which the mobile terminal is to contact to discover application level services which are available from the at least one mobile service providing server 52. Registration consists of terminal registration with the network for connectivity and transport services as is well known and terminal service registration to obtain application level services provided by the mobile service providing servers 52 to obtain for example, services such as VoIP. The address of the advertisement server 102 is required before application level service registration can occur with at least one mobile service providing server 52. The application level service registration may be either a distinct registration process in which the network supplies the address of the advertisement server 102, as described below with reference to FIG. 3, that (distinct registration) may be implemented by an intelligence/application layer inside the mobile terminal providing communications to the advertisement server or an integrated registration process, as described below with reference to FIG. 4, under which the network communicates with the advertisement server and performs registration on behalf of the mobile terminals 12 with at least one mobile service providing server 52 from which application services may be obtained. The network, after service registration is complete with the mobile service providing servers 52, transmits a list of registered services and addresses to the mobile terminal 12 from which the registered services may be obtained. Under both service registration processes the mobile terminals 12 store the address of and a list of available services which may be obtained from the mobile service providing servers 52. The mobile service providing servers 52 may be addressed with any addressing technique used in packet data networks including URLs.

Network registration may be in accordance with the GPRS Attach procedure which is well known and service registration may utilize H.323 registration messages with the mobile service providing servers 52 being addressed by suitable addresses such as URLs.

Figure 3:
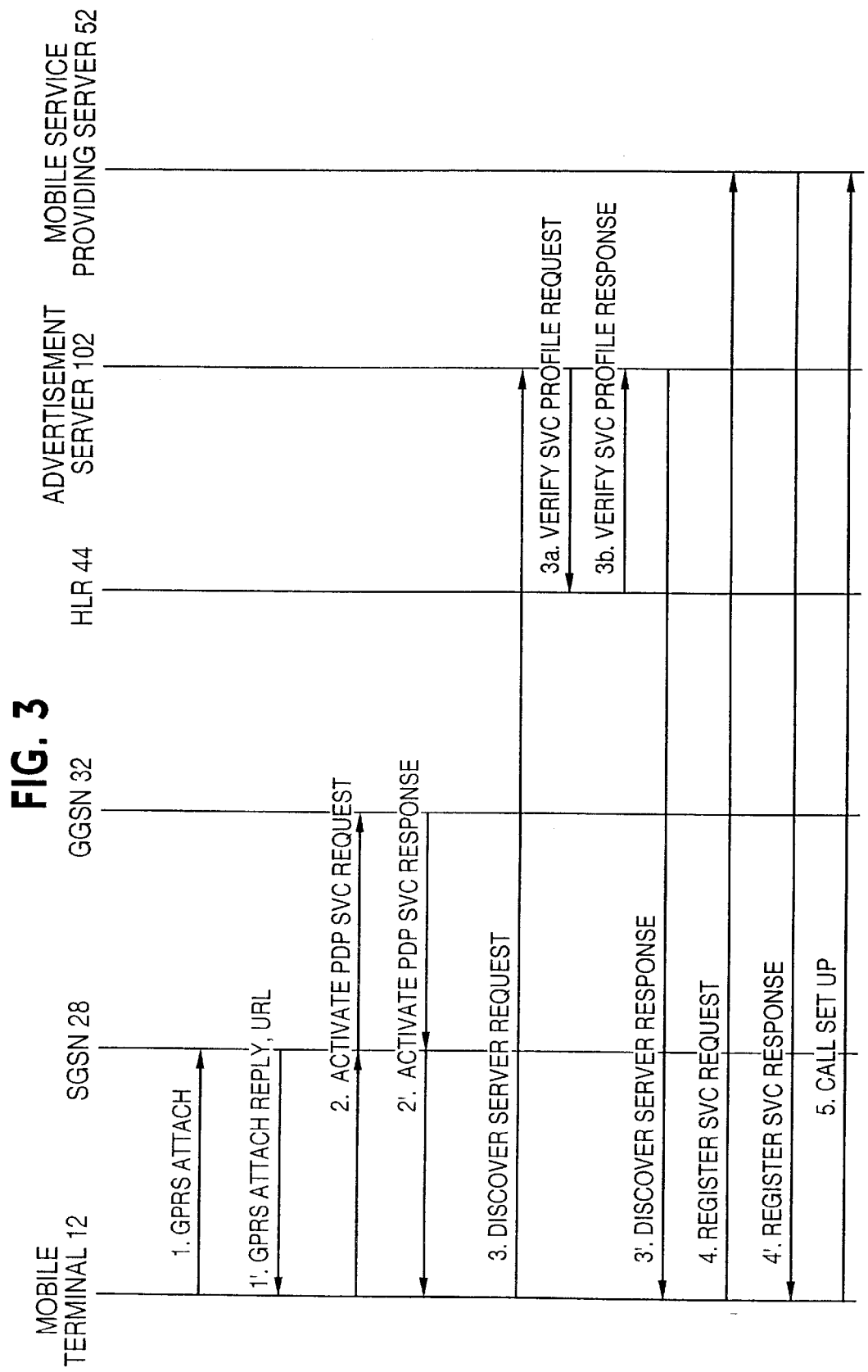
FIG. 3 illustrates an example of the operation of the embodiment of FIG. 2 for the distinct service registration process.

FIG. 3 illustrates the distinct registration process. Initially the mobile terminal 12 issues communication 1 which is a GPRS Attach operation in order to register with the GPRS which is well known to one of the SGSNs 28. In response thereto, the SGSN 28 issues a communication 1' to the mobile terminal 12 which is a GPRS Attach reply which, in addition to the well-known parameters, includes the URL (or the transport address) of advertisement server 102. In response thereto, the mobile terminal 12 issues communication 2 which is an activate Packet Data Protocol (PDP) service request to one of the GGSNs 32 which establishes the session for service registration. The GGSN 32, in response thereto, issues communication 2' which is an activate PDP service response (PDP activation is needed in order to be able to send and receive packet data) to the mobile terminal 12. In response thereto, the mobile terminal 12 sends a discovery server request to the advertisement server 102 using the PDP session established earlier to obtain available services including the addresses of at least one mobile service providing server 52 in the network from which application level services may be obtained. With communication 3a the advertisement server 102 contacts a network entity which, as illustrated without limitation, is the home location register 44, to verify a service profile of the mobile terminal 12. This verification involves if and what mobile services are to be provided. With communication 3b, the home location register 44 communicates to the advertisement server 102 with a verify server profile response message. The advertisement server 102 then responds with message 3', which is a discover server response message, to the mobile terminal 12 which contains the addresses (URLs) of the available mobile service providing servers 52 in the network to the mobile terminal. This message may include further information, including without limitation, available service attributes that describe the capability set of each of mobile service providing servers 52. The mobile terminal 12 transmits communication 4 to the mobile service providing server 52 which is a registration server request which confirms an application level registration with the discovered service. The mobile service providing server 52 transmits communication 4' to the mobile terminal 12 which is a register server response. The mobile terminal 12 transmits communication 5, which is a call setup communication when, without limitation, as in the depicted process, the mobile service providing server 52 is a CPS. The call setup communication 5 is in accordance with known procedures.

The service which is obtained from the at least one mobile service providing server 52, while illustrated in FIG. 3 as a VoIP call, which is obtained from a CPS, may be any application level service. Examples without limitation of available application level services are CPS services, services provided by a streaming server, or an application server providing functions that the mobile terminal 12 cannot support or otherwise desires to acquire from the mobile service providing servers 52 in the network.

Figure 4:
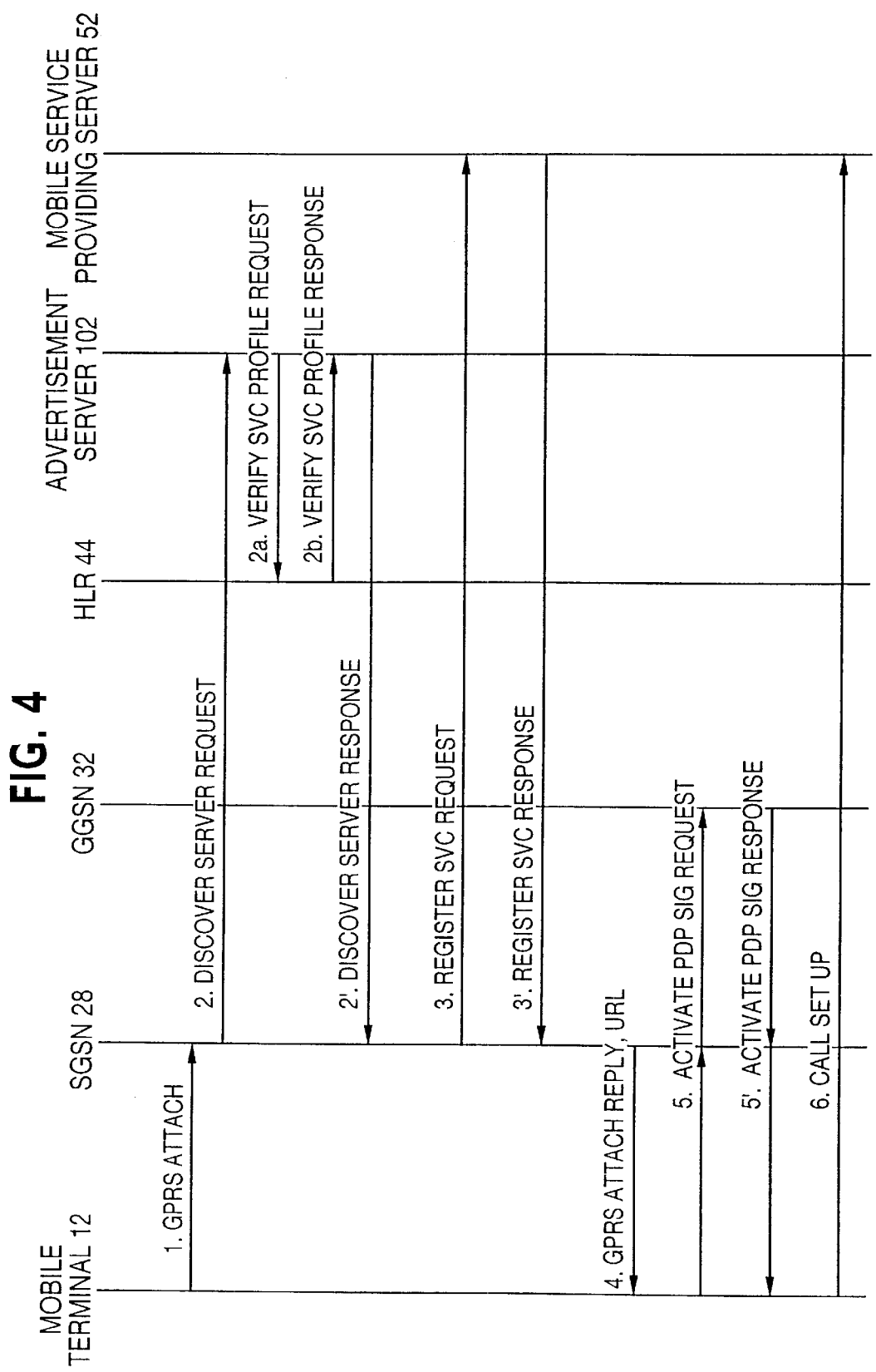
FIG. 4 illustrates an example of the operation of the embodiment of FIG. 2 for the integrated service registration process.

FIG. 4 illustrates the operation of the embodiment of FIG. 2 to perform the integrated service registration process. Message 1 is a GPRS attach message which is transmitted from the mobile terminal 12 to a SGSN 28. The SGSN 28 verifies the identity of the mobile terminal 12 and determines if it will accept registration of the mobile terminal. If registration is accepted, the SGSN 28 issues a discover server's request 2 to the advertisement server 102. The discover server's request is intended to discover all the available application level services for the mobile terminal. The advertisement server 102 communicates with message 2a to the HLR 44 to verify the service profile of the mobile terminal which is stored in the home location register 44. The home location register 44 then responds with communication 2b which is a verify server profile response. Alternatively, the SGSN 28 may verify the service profile instead of the advertisement server 102. It should be understood that the advertisement server 102 is a logical entity which may reside in the SGSN 28. With communication 2' the advertisement server 102 communicates with the SGSN 28 with a discover server response message containing addresses of available mobile service providing servers 52 in the network. The SGSN 28 responds with communication 3 which is a register server request. It should be noted that the register server request may be preceded by a network introduced PDP context application even though the SGSN 28 has the capacity of packet transmission and reception. A PDP context activation, which is well known, may be necessary in view of service registrations requiring a packet address (IP address) which a mobile terminal 12 can only obtain after performing a successful PDP context activation. The mobile service providing server 52 communicates with the SGSN 28 with communication 3' which is a register server response which confirms service registration from the available mobile service providing servers 52. The SGSN 28 communicates with a communication 4 which is a GPRS Attach reply including the URL of the available mobile service providing servers 52 to the mobile terminal 12. The mobile terminal 12 generates communication 5 which is a PDP context activate message towards gateway support node 32 for signalling purposes (depicted as PDP_sig in FIG. 4). GGSN 32 transmits a communication 5', which is an activate PDP_sig response to the SGSN 28 which is transmitted therefrom to the mobile terminal 12. PDP_sig and PDP_svc are essentially PDP context activation messages, which are well known, used for signalling and carrying service registration messages respectively. The mobile terminal 12 transmits communication 6 to the mobile service providing server 56 which is a call setup message. However, it should be understood that the present invention is not limited to the mobile service providing server 52 functioning as a CPS for call setup purposes.

Figure 5:
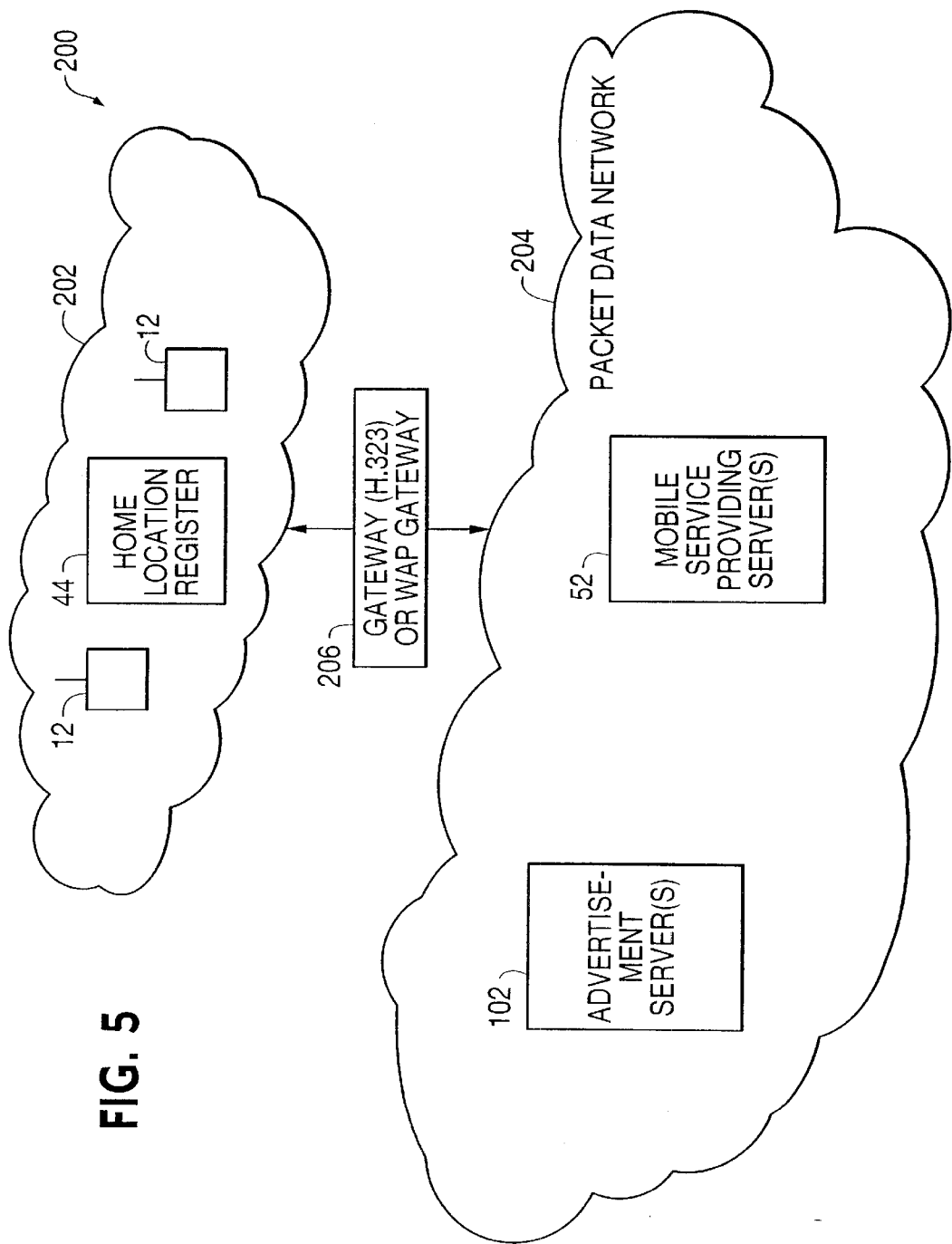
FIG. 5 illustrates a second embodiment of a network in accordance with the present invention.

FIG. 5 illustrates a diagram of a second embodiment 200 in accordance with the present invention. The second embodiment 200 is comprised of a cellular network 202 of known design, which may be a GSM network having a plurality of mobile terminals 12 and a home location register (HLR) 44. Other well-known network entities in the GSM system or other cellular systems have not been illustrated to simplify the description of this embodiment and for the reason they are not necessary to understand this embodiment of the invention. The cellular network 202 is connected to a packet data network 204 of known design through a gateway 206 which without limitation may be a wireless application protocol (WAP) gateway. The mobile terminals 12 communicate with mobile service providing servers 52 using communications of the same type as described above with respect to the first embodiment 100 of the present invention to obtain the addresses of the mobile service providing servers 52 from an advertisement server 102. The gateway 206 maps addressing utilized by the mobile terminals 12 in the cellular network 202 with the alphanumeric based addressing of the packet data network wherein entities are addressed by URL's or other addressing techniques.

Communications from the mobile terminals 12 to the mobile service providing servers 52 and the advertising servers 102 are analogous to the first embodiment 100. The difference between embodiment 100 and 200 is that the original generation of the communications in the cellular network 202 by the mobile terminals is not based upon URL addressing as in the first embodiment. The additional function of address mapping between the cellular network 202 and the packet data network 204 is performed by the gateway 206.

In the second embodiment 200, the same overall function as the first embodiment occurs in that, upon registration with the cellular network 202, the terminals 12 are subsequently registered with one or more mobile service providing servers 52 by communications with the advertisement server(s) 102 in the same manner as described above with respect to the first embodiment.

While the invention has been described in terms of two embodiments, it should be understood that it is not limited to any particular network architecture. Furthermore, it should be understood that the services provided to the mobile terminals 12 by the mobile service providing services 52 may be of any type of diverse application services with the examples given above only being exemplary thereof.

While the invention has been described in terms of its preferred embodiments, it should be understood that numerous modifications may be made thereto without departing from the spirit and scope of the invention. It is intended that all such modifications fall within the scope of the appended claims.

What is claimed is:

1. A network comprising:
   a plurality of mobile terminals which transmit and receive information transmitted through the network;
   a network entity at which the plurality of mobile terminals register for transport level service;
   at least one storage, coupled to the network, which provides application level services, after transport level registration by at least one of the plurality of mobile terminals with the network entity, to at least one of the plurality of mobile terminals after application level registration of at least one of the plurality of mobile terminals with the at least one storage; and
   a directory storage, coupled to the plurality of mobile terminals, which stores addresses of the at least one storage and which provides, after registration for transport level services by at least one of the plurality of mobile terminals with the network entity and in response to a communication from the at least one mobile terminal, at least one address of at least one storage from which the application level services may be obtained.

2. A network in accordance with claim 1 wherein:
   the network comprises a packet data network.

3. A network in accordance with claim 2 wherein:
   the network comprises at least one entity which stores a profile of each mobile terminal which is communicated to the directory storage; and
   the directory storage, in response to the profile of at least one mobile terminal, provides an address of each storage providing a service stored in the profile of the at least one entity from which the at least one terminal may obtain application level services.

4. A network in accordance with claim 2 wherein:.
   the network provides each of the plurality of mobile terminals an address of the directory storage after transport level registration of each of the mobile terminals.

5. A network in accordance with claim 2 wherein:
   each mobile terminal upon activation registers, at the network entity for transport level service and in response to mobile terminal transport level registration, the network registers each activated mobile terminal with the directory storage and the directory storage returns an identification of any accessible registered services to each mobile terminal which stores the identification of registered services for future access.

6. A network in accordance with claim 1 wherein:
   the network comprises a packet data network and a cellular network which are coupled together with a gateway.

7. A network in accordance with claim 6 wherein:
   the mobile terminals are within the cellular network and the directory storage and the at least one storage have addresses in the packet data network.

8. A network in accordance with claim 7 wherein:
   the network comprises at least one entity which stores a profile of each mobile terminal which is communicated to the directory storage; and
   the directory storage, in response to the profile of at least one mobile terminal, provides an address of each storage providing a service stored in the profile of the at least one entity from which the at least one terminal may obtain application level services.

9. A network in accordance with claim 4 wherein:
   the network provides each of the plurality of mobile terminals an address of the directory storage after transport level registration of each of the mobile terminals.

10. A network in accordance with claim 9 wherein:
    the directory storage applies access control rules to control access of the at least one mobile terminal to the at least one storage.

11. A network in accordance with claim 7 wherein:
    each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

12. A network in accordance with claim 6 wherein:
    the network comprises at least one entity which stores a profile of each mobile terminal which is communicated to the directory storage; and
    the directory storage, in response to the profile of at least one mobile terminal, provides an address of each storage providing a service stored in the profile of the at least one entity from which the at least one terminal may obtain application level services.

13. A network in accordance with claim 6 wherein:

the network provides each of the plurality of mobile terminals an address of the directory storage after transport level registration of each of the mobile terminals.

14. A network in accordance with claim 13 wherein:

the directory storage applies access control rules to control access of the at least one mobile terminal to the at least one storage.

15. A network in accordance with claim 6 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

16. A network in accordance with claim 1 wherein:

the network comprises at least one entity which stores a profile of each mobile terminal which is communicated to the directory storage; and the directory storage, in response to the profile of at least one mobile terminal, provides an address of each storage providing a service stored in the profile of the at least one entity from which the at least one terminal may obtain application level services.

17. A network in accordance with claim 16 wherein:

the at least one entity is a home location register.

18. A network in accordance with claim 17 wherein:

the directory storage applies access control rules to control access of the at least one mobile terminal to the at least one storage.

19. A network in accordance with claim 16 wherein:

the directory storage applies access control rules to control access of the at least one mobile terminal to the at least one storage.

20. A network in accordance with claim 1 wherein:

the network provides each of the plurality of mobile terminals an address of the directory storage after transport level registration of each of the mobile terminals.

21. A network in accordance with claim 1 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

22. A network in accordance with claim 1 wherein:

the directory storage applies access control rules to control access of the at least one mobile terminal to the at least one storage.

23. In a network having a plurality of mobile terminals which transmit and receive information transmitted through the network, a network entity at which the plurality of mobile terminals register for transport level service and at least one storage which provides application level services, after registration for transport level service by at least one of the plurality of terminals with the network entity, to at least one of the mobile terminals after application level registration of at least one of the plurality of mobile terminals with the at least one storage, a method of providing the plurality of mobile terminals with an address of the at least one storage to permit obtaining of the application level services by at least one of the plurality of mobile terminals comprising:

providing a directory storage, coupled to the plurality of mobile terminals, which stores addresses of the at least one storage from which the mobile terminals may obtain application level services; and after registration for transport level services by at least one of the plurality of mobile terminals, in response to a communication from the at least one mobile terminal requesting the directory storage, providing at least one address of at least one storage from which the application level services may be obtained; and the at least one mobile terminal to which the at least one address was provided sends a communication to the at least one address of the at least one storage obtained from the directory storage requesting that the addressed storage provide application level services to the at least one mobile terminal sending the communication.

24. A method in accordance with claim 23 wherein:

the network comprises a packet data network.

25. A method in accordance with claim 24 wherein:

the network comprises a packet data network and a cellular network which are coupled together with a gateway.

26. A method in accordance with claim 25 wherein:

the network comprises at least one entity which stores a profile of each mobile terminal which is communicated to the directory storage; and the directory storage, in response to the profile of at least one mobile terminal, provides an address of each storage providing a service stored in the profile of the at least one entity from which the at least one terminal may obtain application level services.

27. A method in accordance with claim 25 wherein:

the network provides each of the plurality of mobile terminals an address of the directory storage after transport level registration of each of the mobile terminals.

28. A method in accordance with claim 25 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

29. A network in accordance with claim 25 wherein:

the directory storage applies access control rules to control access of the at least one mobile terminal to the at least one storage.

30. A method in accordance with claim 24 wherein:

the network comprises at least one entity which stores a profile of each mobile terminal which is communicated to the directory storage; and the directory storage, in response to the profile of at least one mobile terminal, provides an address of each storage providing a service stored in the profile of the at least one entity from which the at least one terminal may obtain application level services.

31. A method in accordance with claim 24 wherein:

the network provides each of the plurality of mobile terminals an address of the directory storage after transport level registration of each of the mobile terminals.

32. A method in accordance with claim 24 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

33. A network in accordance with claim 24 wherein:

the directory storage applies access control rules to control access of the at least one mobile terminal to the at least one storage.

34. A method in accordance with claim 24 wherein:

the mobile terminals are within the cellular network and the directory storage and the at least one storage have addresses in the packet data network.

35. A method in accordance with claim 34 wherein:

the network comprises at least one entity which stores a profile of each mobile terminal which is communicated to the directory storage; and the directory storage, in response to the profile of at least one mobile terminal, provides an address of each storage providing a service stored in the profile of the at least one entity from which the at least one terminal may obtain application level services.

36. A method in accordance with claim 34 wherein:

the network provides each of the plurality of mobile terminals an address of the directory storage after transport level registration of each of the mobile terminals.

37. A method in accordance with claim 34 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

38. A network in accordance with claim 34 wherein:

the directory storage applies access control rules to control access of the at least one mobile terminal to the at least one storage.

39. A method in accordance with claim 23 wherein:

the network comprises at least one entity which stores a profile of each mobile terminal which is communicated to the directory storage; and the directory storage, in response to the profile of at least one mobile terminal, provides an address of each storage providing a service stored in the profile of the at least one entity from which the at least one terminal may obtain application level services.

40. A network in accordance with claim 39 wherein:

the directory storage applies access control rules to control access of the at least one mobile terminal to the at least one storage.

41. A method in accordance with claim 23 wherein:

the network provides each of the plurality of mobile terminals an address of the directory storage after transport level registration of each of the mobile terminals.

42. A method in accordance with claim 23 wherein:

each mobile terminal upon activation registers at the network entity for transport level service and in response to mobile terminal transport level registration, the network registers each activated mobile terminal with the directory storage and the directory storage returns an identification of any accessible registered services to each mobile terminal which stores the identification of registered services for future access.

43. A method in accordance with claim 23 wherein:

the directory storage applies access control rules to control access of the at least one mobile terminal to the at least one storage.

* * * * *